(12) United States Patent
Heinmiller et al.

(10) Patent No.: US 6,445,781 B1
(45) Date of Patent: Sep. 3, 2002

(54) METHOD OF PROVIDING CALLER IDENTIFICATION FOR CALLS PLACED OVER AN INTERNET

(75) Inventors: Wayne Robert Heinmiller, Elgin; Robert Wesley Bossemeyer, Jr., St. Charles; Bruce Edward Stuckman, Algonquin, all of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 145 days.

(21) Appl. No.: 09/591,534

(22) Filed: Jun. 9, 2000

Related U.S. Application Data

(63) Continuation of application No. 09/154,336, filed on Sep. 16, 1998, now Pat. No. 6,101,246.

(51) Int. Cl.[7] .................................................. H04M 1/56
(52) U.S. Cl. ........................... 379/142.01; 379/93.17; 379/93.23; 379/245
(58) Field of Search .......................... 379/93.17, 93.23, 379/114.01, 142.01, 121, 127, 229, 230, 243, 245

(56) References Cited

U.S. PATENT DOCUMENTS

| | | | | |
|---|---|---|---|---|
| 5,349,638 A | * | 9/1994 | Pitroda et al. | 379/142 |
| 5,497,414 A | * | 3/1996 | Bartholomew | 379/142 |
| 5,521,969 A | * | 5/1996 | Paulus et al. | 379/142 |
| 5,546,447 A | * | 8/1996 | Skarbo et al. | 379/142 |
| 5,559,860 A | * | 9/1996 | Mizikovsky | 379/58 |
| 5,602,908 A | * | 2/1997 | Fan | 379/199 |
| 5,724,412 A | * | 3/1998 | Srinivasan | 379/93.23 |
| 5,729,592 A | * | 3/1998 | Frech et al. | 379/67 |
| 5,742,670 A | * | 4/1998 | Bennett | 379/142 |
| 5,805,688 A | * | 9/1998 | Gillespie et al. | 379/220 |
| 5,832,072 A | * | 11/1998 | Rozenblit | 379/246 |
| 5,850,435 A | * | 12/1998 | Devillier | 379/374 |
| 5,864,612 A | * | 1/1999 | Strauss et al. | 379/142 |
| 5,901,207 A | * | 5/1999 | Pickeral | 379/127 |
| 5,953,399 A | * | 9/1999 | Farris et al. | 379/201 |
| 5,974,128 A | * | 10/1999 | Urban et al. | 379/207 |

* cited by examiner

*Primary Examiner*—Binh Tieu
(74) *Attorney, Agent, or Firm*—Dale B. Halling

(57) ABSTRACT

The invention uses the advanced intelligent network to provide caller identification for calls placed over the internet (24). A long distance call placed with an internet carrier results in the originating SSP (14) forwarding the call to an originating POP (22) for the internet carrier. The caller ID information is routed through the signaling system 7 network (16) to the SSP (32) in the terminating network. The call is routed to a terminating POP (26) and then to the SSP (32) in the terminating network. The SSP (32) inserts the caller ID information received through the SS7 network (16) and routes the call to the terminating line (30).

11 Claims, 8 Drawing Sheets

METHOD OF PROVIDING CALLER IDENTIFICATION FOR CALLS PLACED OVER AN INTERNET

This is a continuation of U.S. application Ser. No. 09/154,336, filed on Sep. 16, 1998 now U.S. Pat. No. 6,101,246, which application is hereby incorporated by reference herein.

FIELD OF THE INVENTION

The present invention relates generally to telecommunication systems and more particularly to a method of providing caller identification for calls placed over an internet.

BACKGROUND OF THE INVENTION

A number of internet long-distance telephone companies (ITC) have been formed. A caller who uses these companies places a standard long distance telephone call. The call is routed by the public switched telephone network (PSTN) to the internet telephone company's point of presence (POP). The POP formats the call for transport over the internet to a second POP in the destination local access transport area (LATA). The call is then routed over the PSTN to the callee's telephone. In the process the caller identification (Caller ID) information is lost. Even when the internet long distance company places the Caller ID information into the call at the terminating POP, the central office (CO)/service switching point (SSP) rejects the Caller ID information. The CO/SSP checks the Caller ID to determine if it has been tampered with, corrupted or altered. The CO/SSP will reject the Caller ID information since the call appears to originate from the ITC POP and not the originating number.

Thus there exists a need for a method of providing call identification for calls placed over the internet.

DETAILED DESCRIPTION OF THE DRAWINGS

The invention uses the advanced intelligent network to provide caller identification for calls placed over the internet. A long distance call placed with an internet carrier results in the originating SSP forwarding the call to an originating POP for the internet carrier. In one embodiment, the caller ID information is routed through the signaling system 7 (SS7) network to the SSP in the terminating network. The call is routed to a POP in the terminating network and then to the SSP in the terminating network. The SSP inserts the caller ID information received through the SS7 network and routes the call to the terminating line. In another embodiment the caller ID information is encrypted and passed through the internet. The SSP in the terminating network then sends an authentication query to a service control point (SCP). The SCP determines if the encrypted caller ID is valid. In one embodiment the caller ID information is considered valid if it can be decrypted. When the encrypted caller ID is valid, the call is routed to the terminating line with the caller ID information. In another embodiment, an authentication code is sent as part of the caller ID information. When the authentication code is valid the caller ID information is routed to the terminating line.

Figure 1:
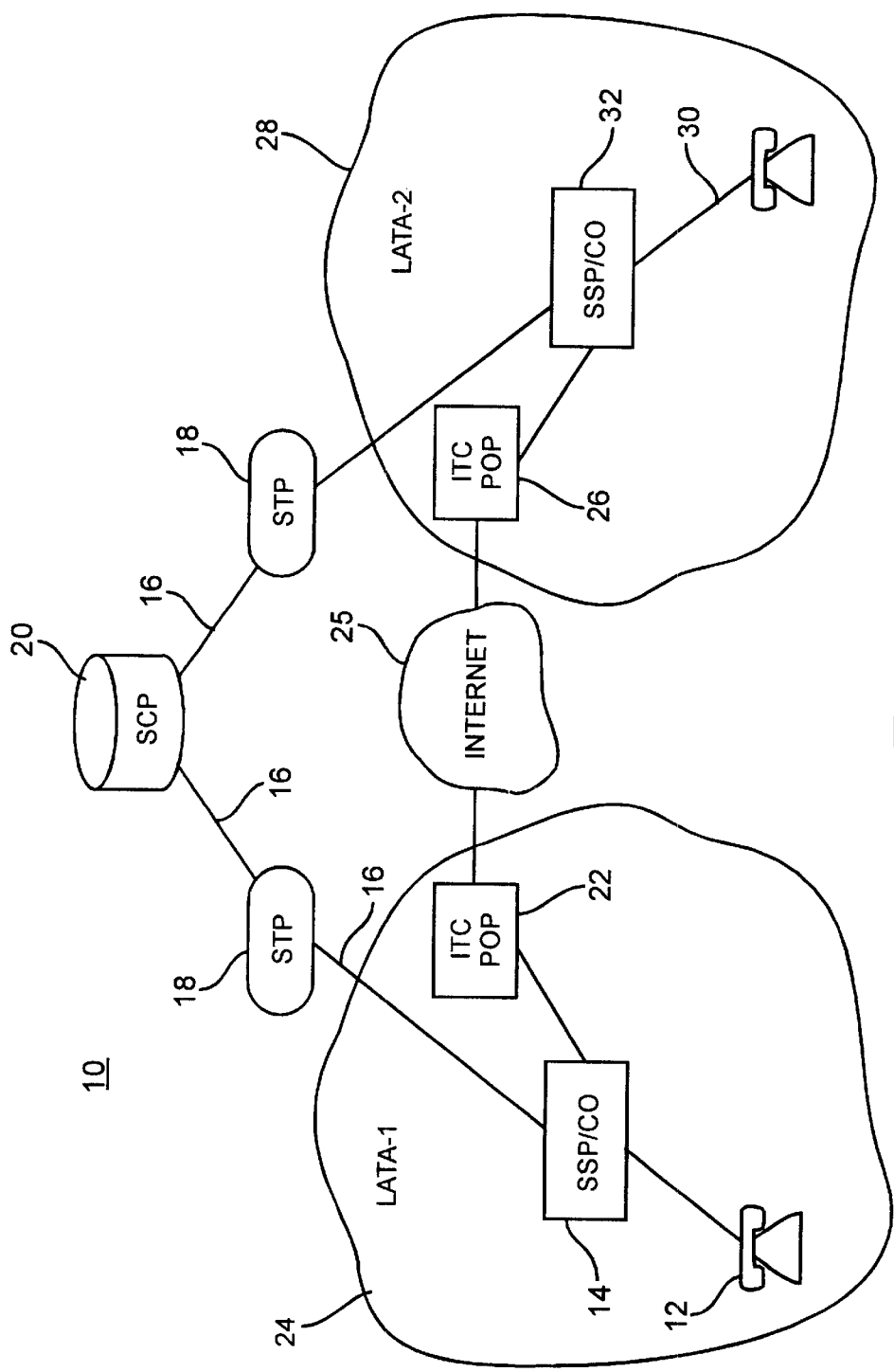
FIG. 1 is a block diagram of a system for providing caller identification information for an internet telephone carrier, in accordance with one embodiment of the invention.

FIG. 1 is a block diagram of a system 10 for providing caller identification information for an internet telephone carrier, in accordance with one embodiment of the invention. A standard long distance call placed through an internet telephone carrier (ITC), starts by a subscriber 12 dialing the long distance number. An originating SSP/CO 14 triggers on the long distance number and sends a routing query through the SS7 network 16. The SS7 network 16 has a plurality of signal transfer points 18 that route the query to the appropriate service control point (SCP) 20. The SCP 20 analyzes the routing query containing the originating telephone line and the dialed long distance number. Based on this information the SCP 20 determines the call must be routed to the ITC's POP 22 in the first LATA 24. The SSP 14 receives routing instruction to the ITC POP 22, and routes the call to the ITC POP 22. The ITC POP 22 routes the call over the internet 24 to a second ITC POP 26. The second ITC POP 26 is in a second LATA 28 containing the terminating line 30. The ITC POP 26 routes the call to a second SSP/CO 32. The SSP/CO 32 then routes the call to the terminating line 30. The invention uses the intelligent part of the advanced intelligent network, to pass either the caller ID information around the internet 24 or authentication information through the internet 24. In one embodiment, the caller ID information is routed from the SSP 14 through the signal network to the SSP 32. The SSP 32 then matches the caller ID information with the appropriate call. The match, in one embodiment, is performed by knowing the originating line and dialed telephone number. In another embodiment, the caller ID information is encrypted. The SSP 32 then sends a authentication query to the SCP 20, that determines if the encrypted caller ID information can be decrypted which authenticates the information. The caller ID information is added to the call routed to the terminating line 30. Note that throughout this document caller ID information can include both the caller ID and charged party ID. The charged party ID is used for billing purposes.

Figure 2:
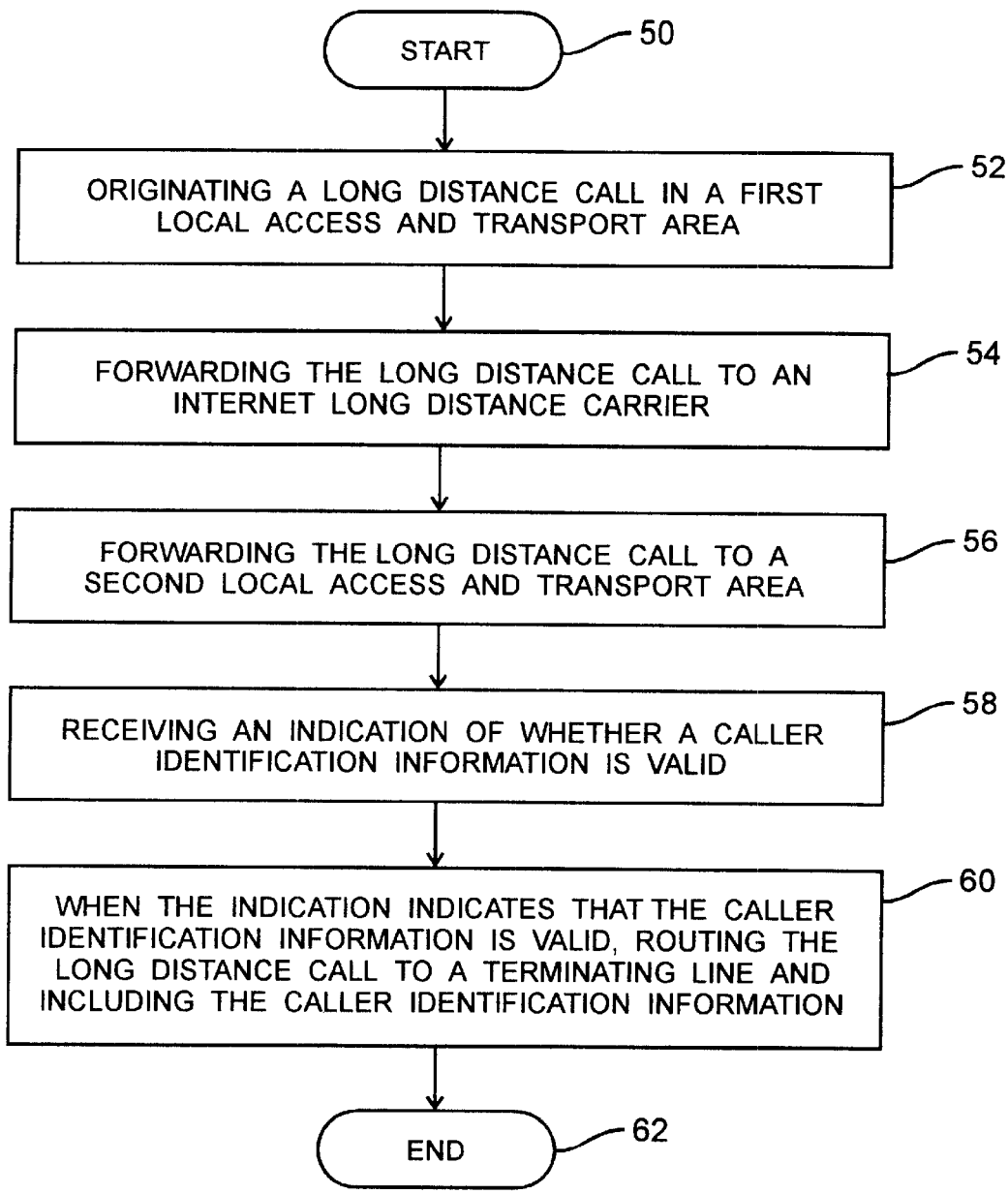
FIG. 2 is a flow chart of the steps used in providing caller identification for calls placed over the internet in accordance with one embodiment of the invention.

FIG. 2 is a flow chart of the steps used in providing caller identification for calls placed over the internet in accordance with one embodiment of the invention. The process starts, step 50, by originating a long distance call in a first local access and transport area at step 52. The long distance call is forwarded to an internet long distance carrier at step 54. Next, the long distance call is forwarded to a second local access and transport area step 56. An indication of whether a call identification information is valid is received at step 58. When, at step 60, the indication indicates that the caller identification information is valid, the long distance call is routed to a terminating line and includes the caller identification information which ends the process at step 62. In one embodiment, the long distance call is routed to the terminating line without the caller identification information, when the indication indicates that the caller identification information is not valid. In another embodiment, the first local access and transport area can be the same as the second local access and transport area. In another embodiment, the long distance call is routed to the terminating line with an indicator that the caller identification information is unreliable. In another embodiment, a routing query is sent from a SSP in the first LATA to a SCP. A routing instruction is received from the SCP that includes an encrypted code.

In another embodiment a caller identification query, including the encrypted code, is sent from the SSP in the second LATA to a SCP. In one embodiment the encrypted code includes the caller identification information. In another embodiment the encrypted code is an authentication code and the caller ID information is sent unencrypted. The SCP determines if the encrypted code is valid. When the encrypted code is valid, the SCP sends a valid indication to the SSP in the second LATA.

In another embodiment the SSP in the first LATA sends a routing query to the SCP. The caller identification information is sent over the signaling network to the destination SSP in the second LATA.

Figure 3:
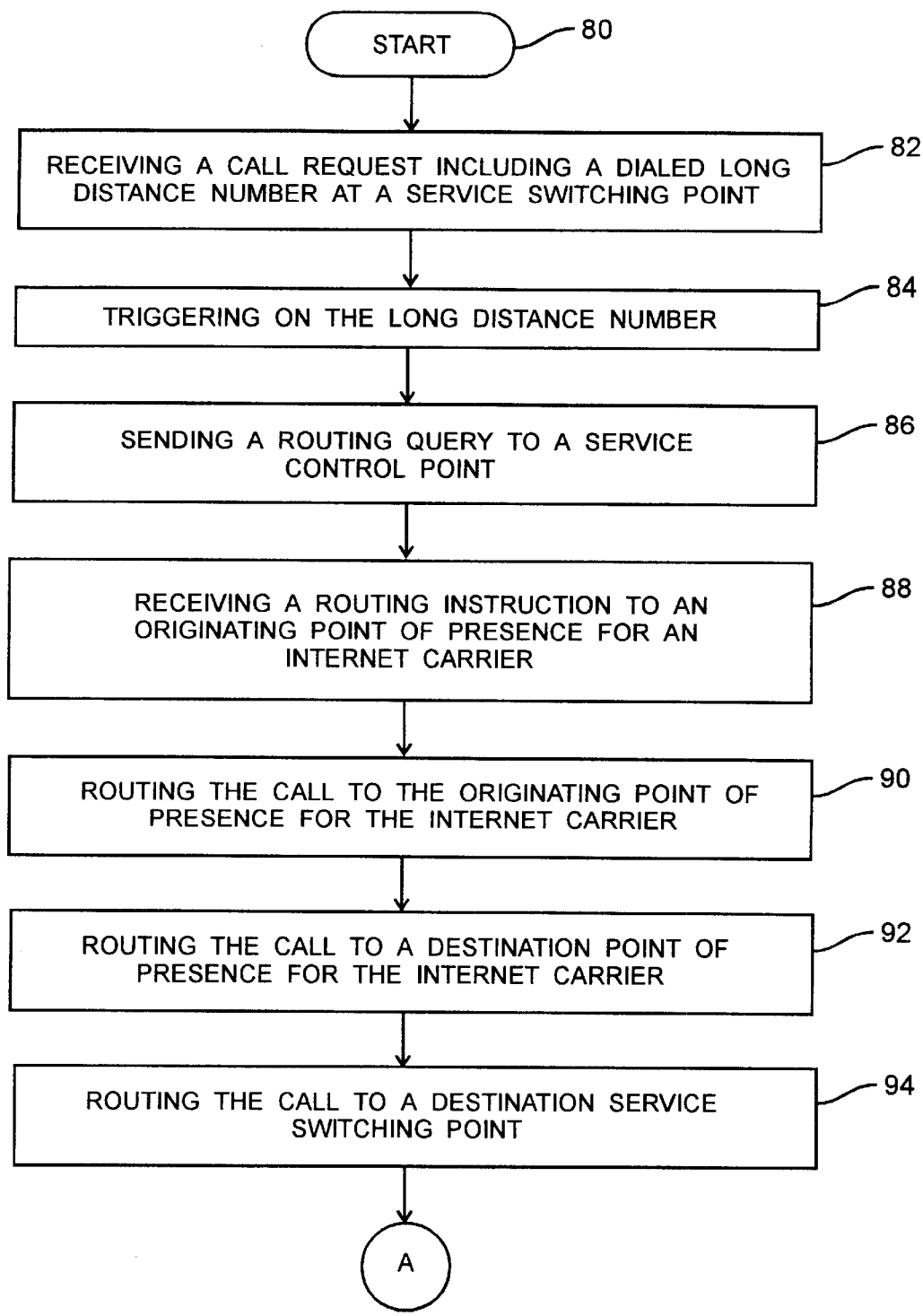
FIGS. 3 & 4 are a flow chart of the steps used in providing caller identification for calls placed over the internet in accordance with one embodiment of the invention.
Figure 4:
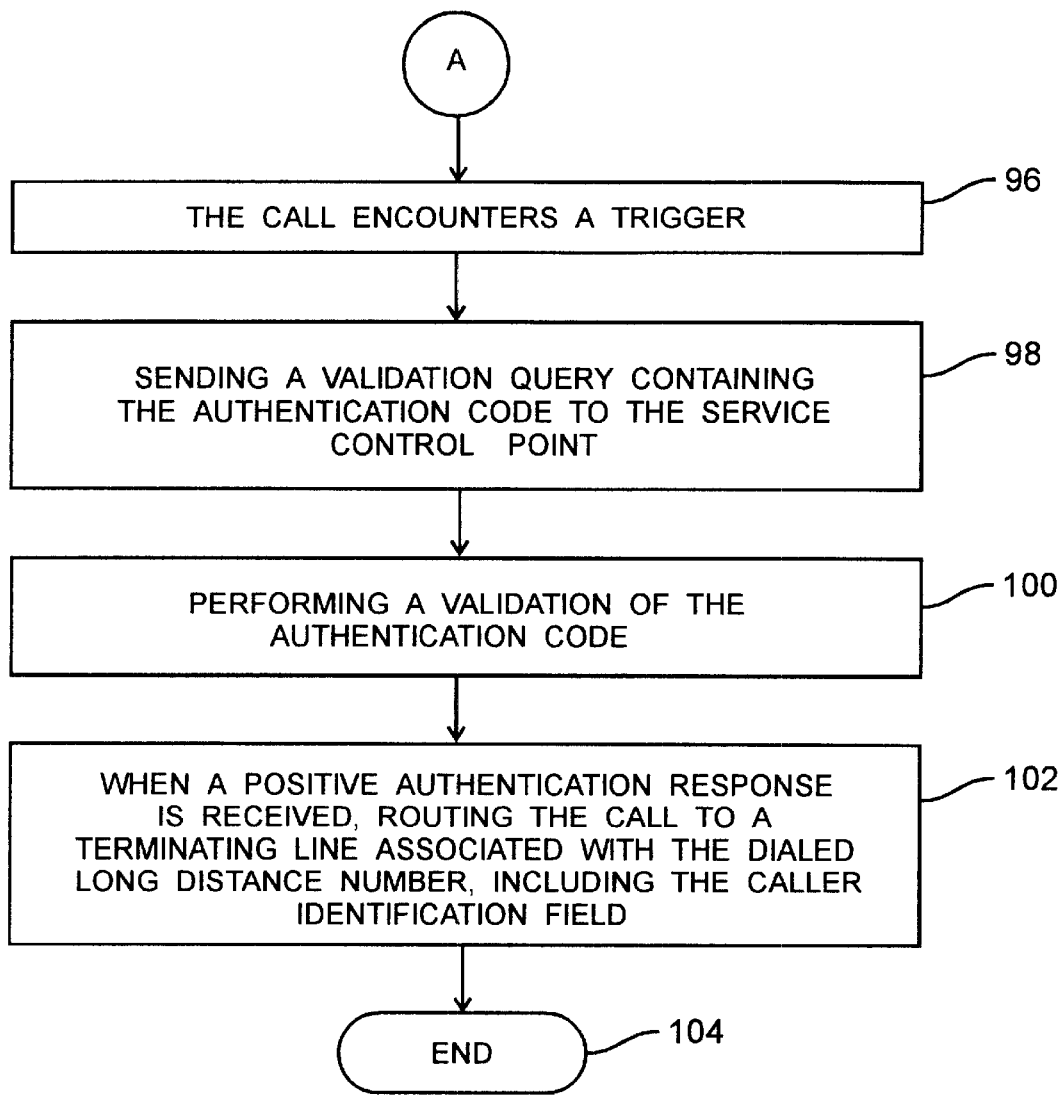

FIGS. 3 & 4 are a flow chart of the steps used in providing caller identification for calls placed over the internet in accordance with one embodiment of the invention. The process starts, step 80, by receiving a dialed long distance number at an originating service switching point at step 82. The dialed long distance number is triggered on at step 84. A routing query is sent to a service control point, that contains the dialed long distance number and an originating telephone line at step 86. When the call requires routing to an internet telephone carrier, a routing response is sent that includes an authentication code at step 88. The call is routed, including a caller identification field, to an originating point of presence for the internet telephone carrier at step 90. The call is routed over the internet to a destination point of presence for the internet telephone carrier at step 92. The call is routed to a destination service switching point at step 94. The call encounters a trigger at step 96. An authentication query containing the authentication code is sent to the service control point at step 98. The authentication code is validated at step 100. When, at step 102, a positive authentication response is received, the call is routed to a terminating line associated with the dialed long distance number and includes the caller identification field which ends the process at step 104. In another embodiment the call is routed to the terminating line without the caller identification field when the positive validation response is not received.

Figure 5:
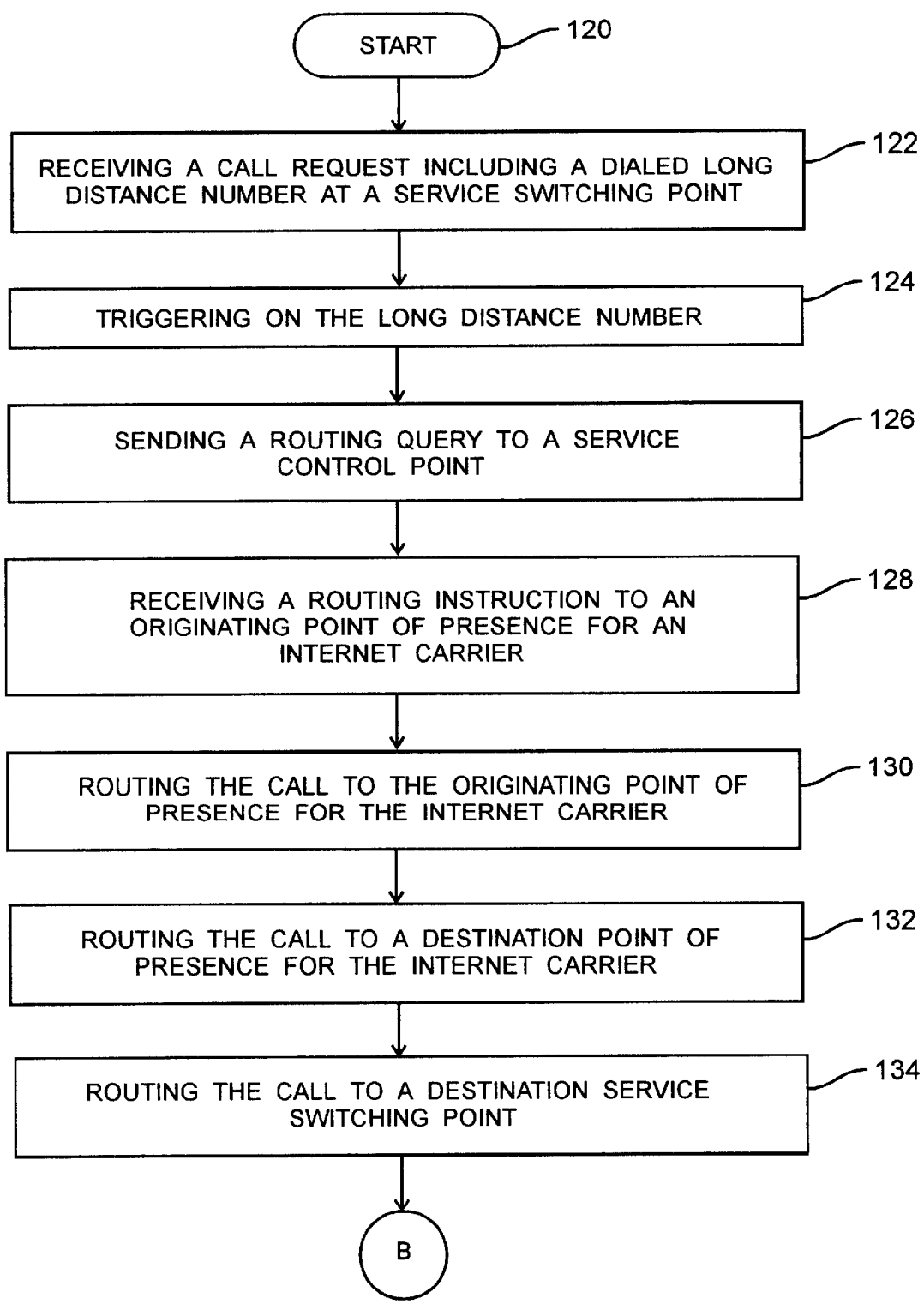
FIGS. 5 & 6 are a flow chart of the steps used in providing caller identification for calls placed over the internet in accordance with one embodiment of the invention.
Figure 6:
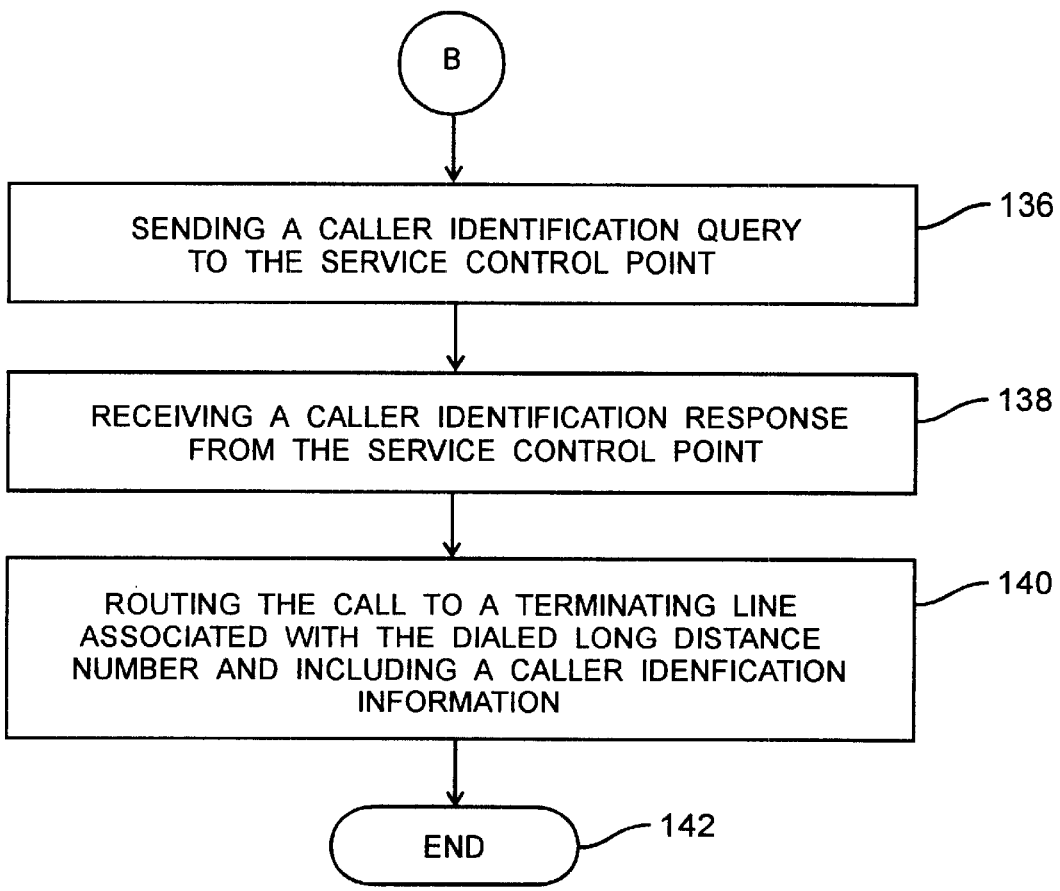

FIGS. 5 & 6 are a flow chart of the steps used in providing caller identification for calls placed over the internet in accordance with one embodiment of the invention. The process starts, step 120, by receiving a call request including a dialed long distance number at a service switching point at step 122, The long distance number is triggered on at step 124. A routing query is sent to a service control point at step 126. A routing instruction to an originating point of presence is received at step 128. The call is routed to the originating point presence for the internet carrier at step 130. The call is routed to a destination point of presence for the internet carrier at step 132. The call is routed to a destination service switching point at step 134. A caller identification query is sent to the service control point at step 136. A caller identification response from the service control point is received at step 138. At step 140, the call is routed to a terminating line associated with the dialed long distance number and includes a caller identification information which ends the process at step 142. In another embodiment, the dialed long distance number and originating telephone line is sent as part of the routing query.

In another embodiment it is determined if the call should be routed to the internet carrier. When the call is to be routed to the internet carrier, an authentication code is selected. The authentication code is sent as part of the routing instruction. The authentication code is sent to the originating POP. The authentication code is sent to the destination POP. The authentication code is then sent to the destination SSP. The destination SSP sends the authentication code as part of the caller identification query to the SCP. The SCP determines if the authentication code is valid. When the authentication code is not valid, the call is routed to the terminating line without the caller identification information.

In another embodiment, the SCP determines if the call is to be routed to the internet carrier. When the call is to be routed to the internet carrier, a call processing record including an originating telephone line and the dialed long distance telephone number is stored. The SCP determines if the caller identification query is associated with the call processing record. A caller identification valid is sent as part of the caller identification response when the caller identification query is associated with the call processing record. The caller identification includes sending the originating telephone line and the dialed long distance number. The caller identification valid is sent as part of the caller identification response when the caller identification query is associated with the call processing record. When the caller identification query is not associated with the call processing record, the call is routed to the terminating line without the caller identification information.

Figure 7:
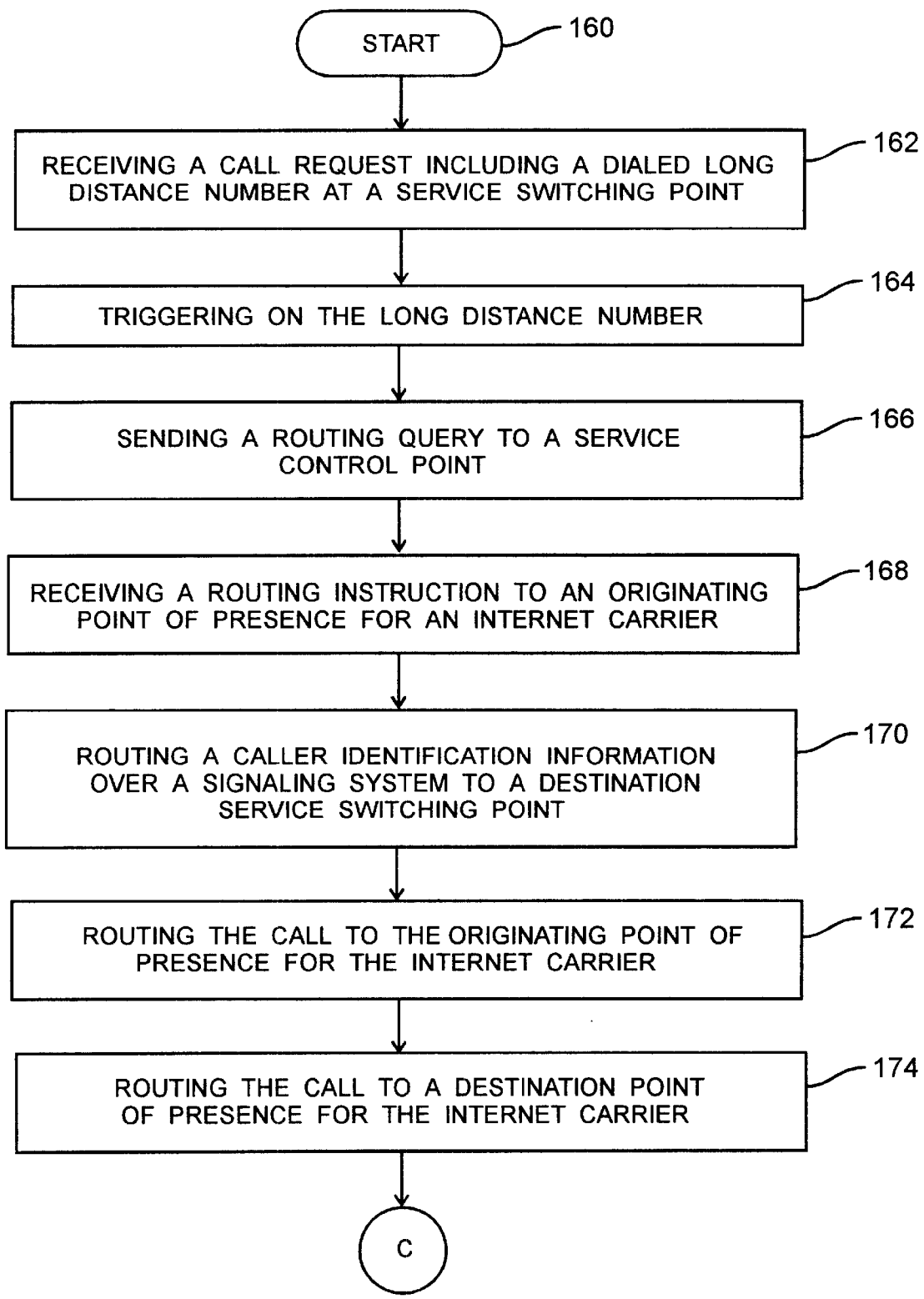
FIGS. 7 & 8 are a flow chart of the steps used in providing caller identification for calls placed over the internet in accordance with one embodiment of the invention.
Figure 8:
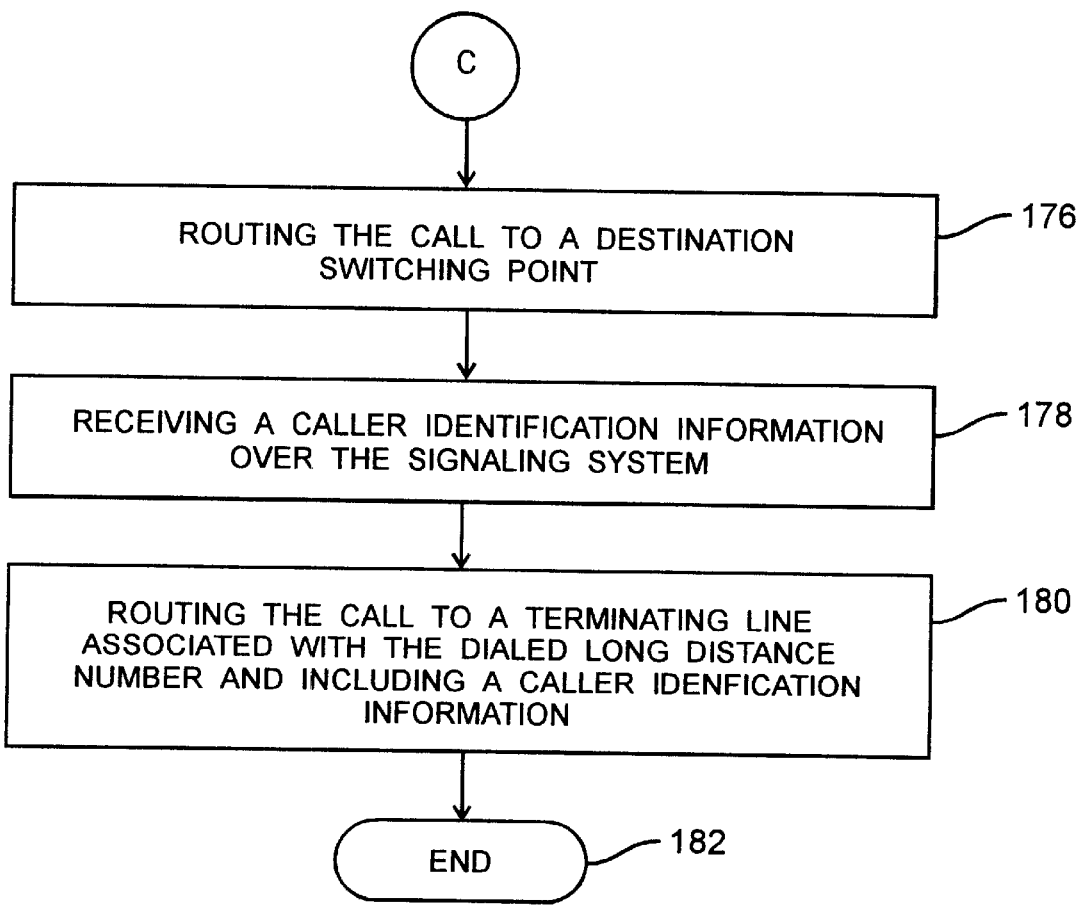

FIGS. 7 & 8 are a flow chart of the steps used in providing caller identification for calls placed over the internet in accordance with one embodiment of the invention. The process starts, step 160, by receiving a call request including a dialed long distance number at a service switching point at step 162. The long distance number is triggered on at step 164. A routing query is sent to a service control point at step 166. A routing instruction to an originating point of presence for an internet carrier is received at step 168. A caller identification information is routed over a signaling system to a destination service switching point at step 170. The call is routed to the originating point of presence for the internet carrier at step 172. The call is routed to a destination point of presence for the internet carrier at step 174. The call is routed to a destination service switching point at step 176. The caller identification information is received over the signaling system at step 178. At step 180 the call is routed to a terminating line associated with the dialed long distance number and includes the caller identification information which ends the process at step 182.

Note that call identification information can include both caller ID and/or charged party ID. In addition, the caller ID may be sent by one of the methods described above, while the charged party ID may be sent by another method described above for the same call. For instance, the caller ID may be encrypted and passed through the internet and the charged party ID routed through the intelligent network for the same call.

Using the methods described above caller identification information can be sent securely and accurately, when a long distance call is carried over the internet.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description.

Accordingly, it is intended to embrace all such alterations, modifications, and variations in the appended claims.

What is claimed is:

1. A method of providing caller identification for calls placed over an internet, comprising the steps of:

(a) receiving a dialed long distance number at an originating service switching point;

(b) sending a routing query to a service control point;

(c) when the call requires routing to an internet telephone carrier, sending a routing response including an authentication code;

(d) routing the call including a caller identification field to an originating point of presence for the internet telephone carrier;

(e) routing the call over the internet to a destination point of presence for the internet telephone carrier;

(f) routing the call to a destination service switching point;

(g) determining a billing information based upon an originating telephone number;

(h) sending an authentication query containing the authentication code to the service control point; and (i) when a positive authentication response is received, routing the call to a terminating line associated with the dialed long distance number, including the caller identification field.

2. The method of claim 1, wherein step (a) further includes the step of:

(a1) triggering on the dialed long distance number.

3. The method of claim 1, wherein the routing query of step (b) comprises the dialed long distance number and an originating telephone number.

4. The method of claim 1, wherein the routing, response of step (c) includes an authentication code.

5. The method of claim 4, wherein step (h) further includes the step of:

performing a validation of the authentication code.

6. A method of providing caller identification for calls placed over an internet, comprising the steps of:

(a) receiving a call request at a service switching point;

(b) sending a routing query to a service control point;

(c) receiving a routing instruction to an originating point of presence for an internet carrier;

(d) routing the call over the internet carrier;

(e) determining a billing information based upon an originating telephone number;

(f) sending a caller identification query to the service control point;

(g) receiving a caller identification response from the service control point; and (h) routing the call to a terminating line associated with a dialed long distance number and including a caller identification information.

7. The method of claim 6, wherein step (a) further includes the step of:

(a1) triggering on a dialed long distance number.

8. A method of providing caller identification for calls placed over an internet comprising the steps of:

(a) originating a long distance call in a first local access and transport area;

(b) forwarding the call to an internet carrier;

(c) forwarding the call to a second local access and transport area;

(d) receiving an indication that a caller identification information is valid;

(e) routing the long distance call to a terminating line and including the caller identification information.

9. The method of claim 8, wherein step (b) further includes the steps of:

(b1) sending a routing query from a service switching point in the first local access transport area to a service control point;

(b2) receiving a routing instruction from the service control point including an encrypted code.

10. The method of claim 9, wherein step (c) further includes the steps of:

(c1) sending a caller identification query from a service switching point in the second local access and transport area to the service control point, including the encrypted code;

(c2) determining that the encrypted code is valid;

(c3) sending a valid indication to the service switching point in the second local access and transport area.

11. The method of claim 10, wherein step (c) further includes the steps of:

(c4) determining that the encrypted code is not valid.

* * * * *